Figure 4:
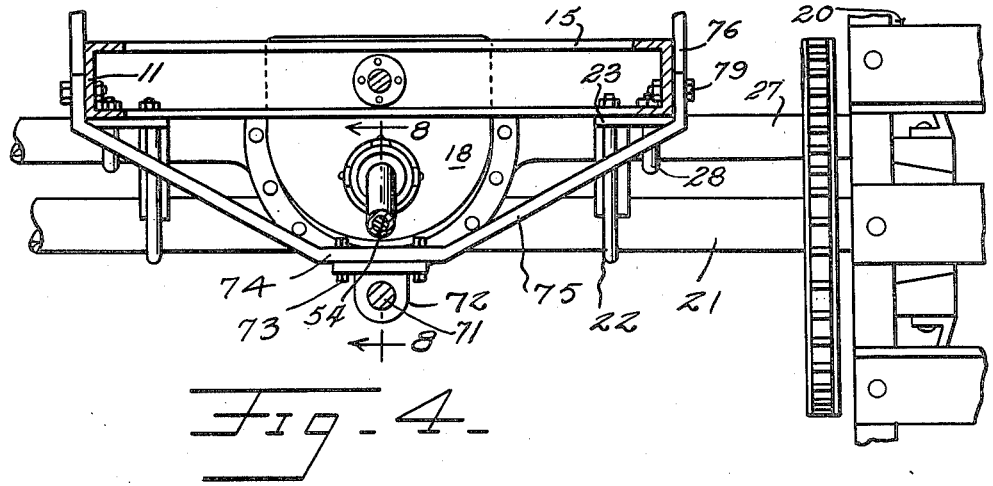

July 10, 1951  J. P. CRAIN  2,560,384
MARSH BUGGY
Filed June 11, 1947  5 Sheets-Sheet 1
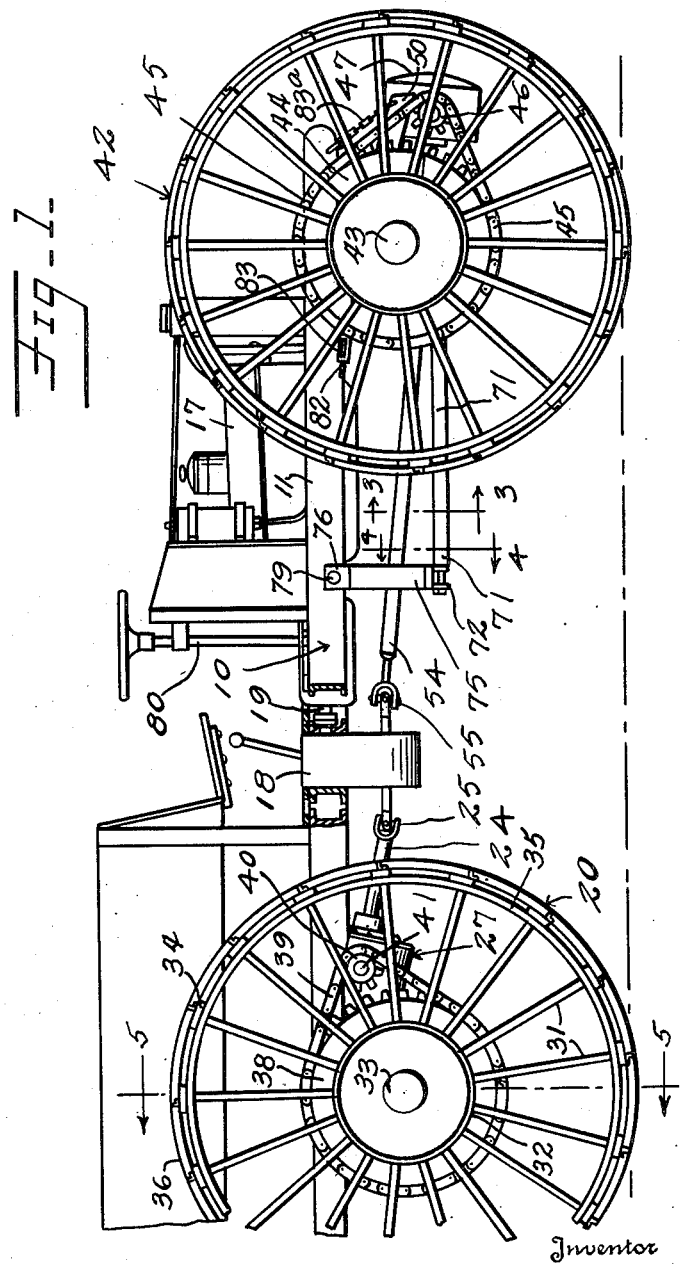
Inventor
JOHN P. CRAIN
By Kimmel & Crowell
Attorneys

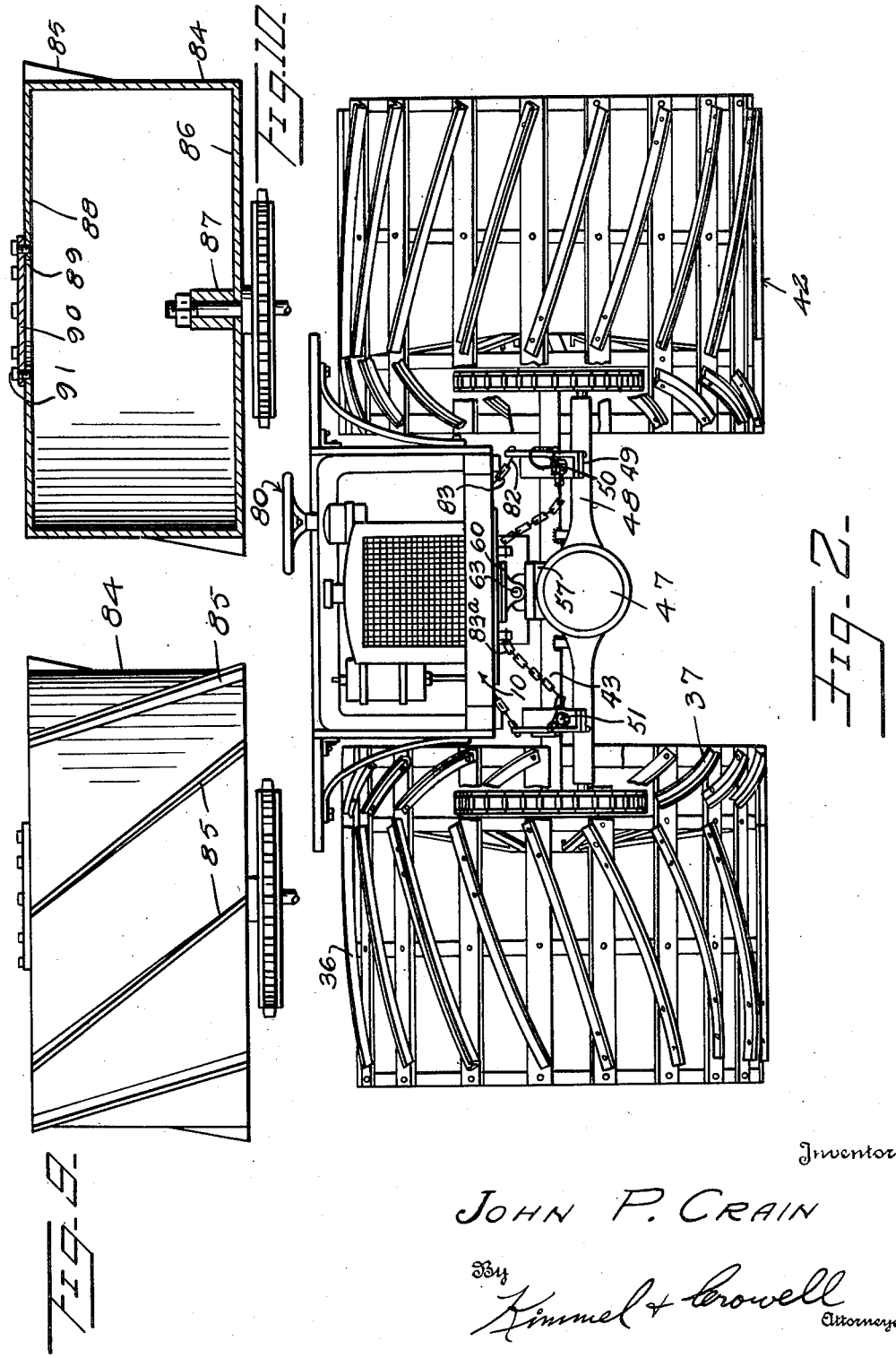

Inventor
JOHN P. CRAIN
By
Kimmel & Crowell
Attorneys

July 10, 1951 J. P. CRAIN 2,560,384
MARSH BUGGY
Filed June 11, 1947 5 Sheets-Sheet 5
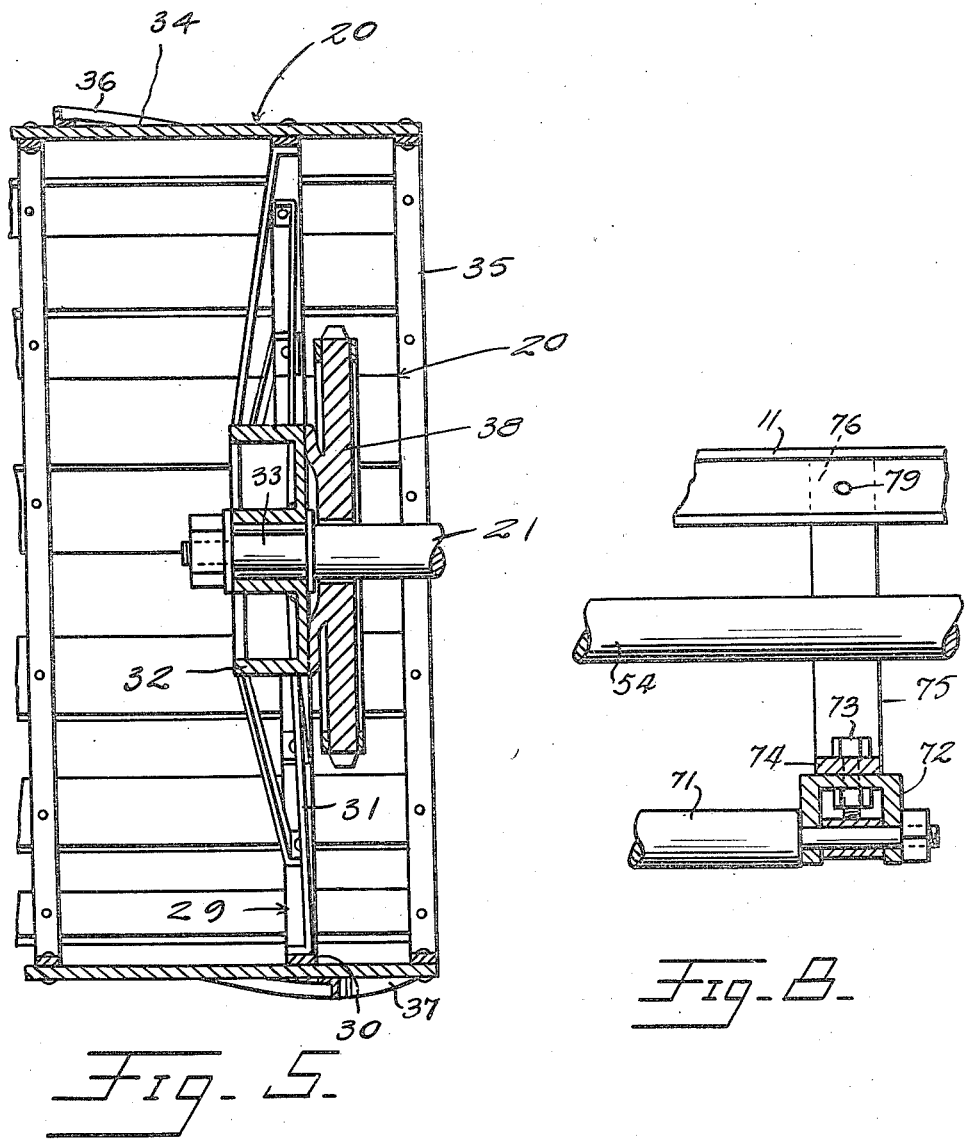
Inventor
JOHN P. CRAIN Patented July 10, 1951

2,560,384

UNITED STATES PATENT OFFICE 2,560,384

MARSH BUGGY

John P. Crain, Grand Chenier, La., assignor of one-half to Albert H. Crain, Grand Chenier, La.

Application June 11, 1947, Serial No. 753,920

1 Claim. (Cl. 180—49)

This invention relates to motor vehicles or tractors.

An object of this invention is to provide a vehicle which is designed particularly for movement over soft ground, such as marshy ground, and soft sand, and also over water.

Another object of this invention is to provide a tractor which is provided with large and wide barrel-like wheels so as to afford the necessary support for the vehicle in order to prevent the wheels from sinking into soft marshy ground and also water when equipped with wheels adapted to such purpose.

A further object of this invention is to provide a tractor of this kind which includes means for driving both the front and rear wheels so that the vehicle can readily move over soft ground without digging into the ground.

Another object of this invention is to provide a four-wheel driven vehicle on which the axle, supporting the two wheels employed in steering the vehicle, may rotate to a certain degree on both its vertical and horizontal axis and yet the wheels attached thereto will continue to receive power from the engine.

With the above and other objects in view, my invention consists in the arrangement, combination and details of construction disclosed in the drawings and specification, and then more particularly pointed out in the appended claim.

Figure 3:
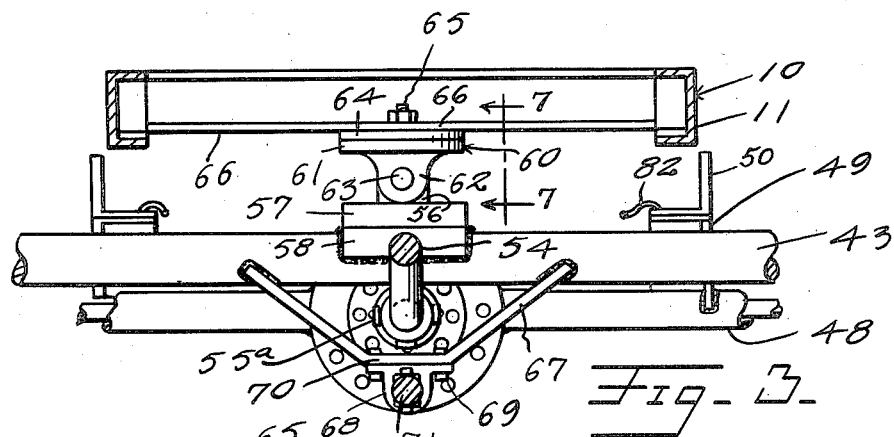
Figure 7:
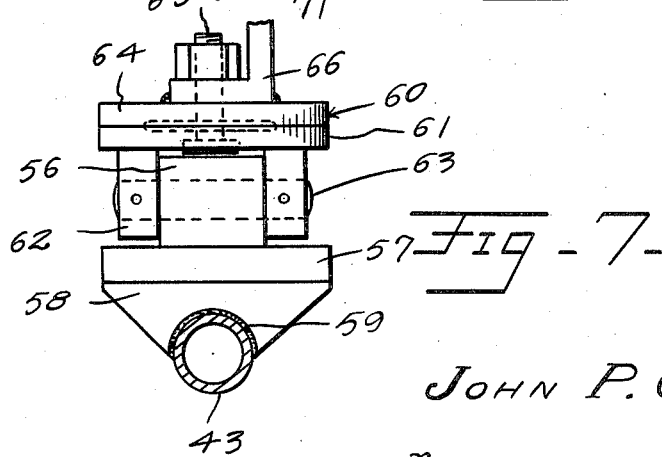
Figure 6:
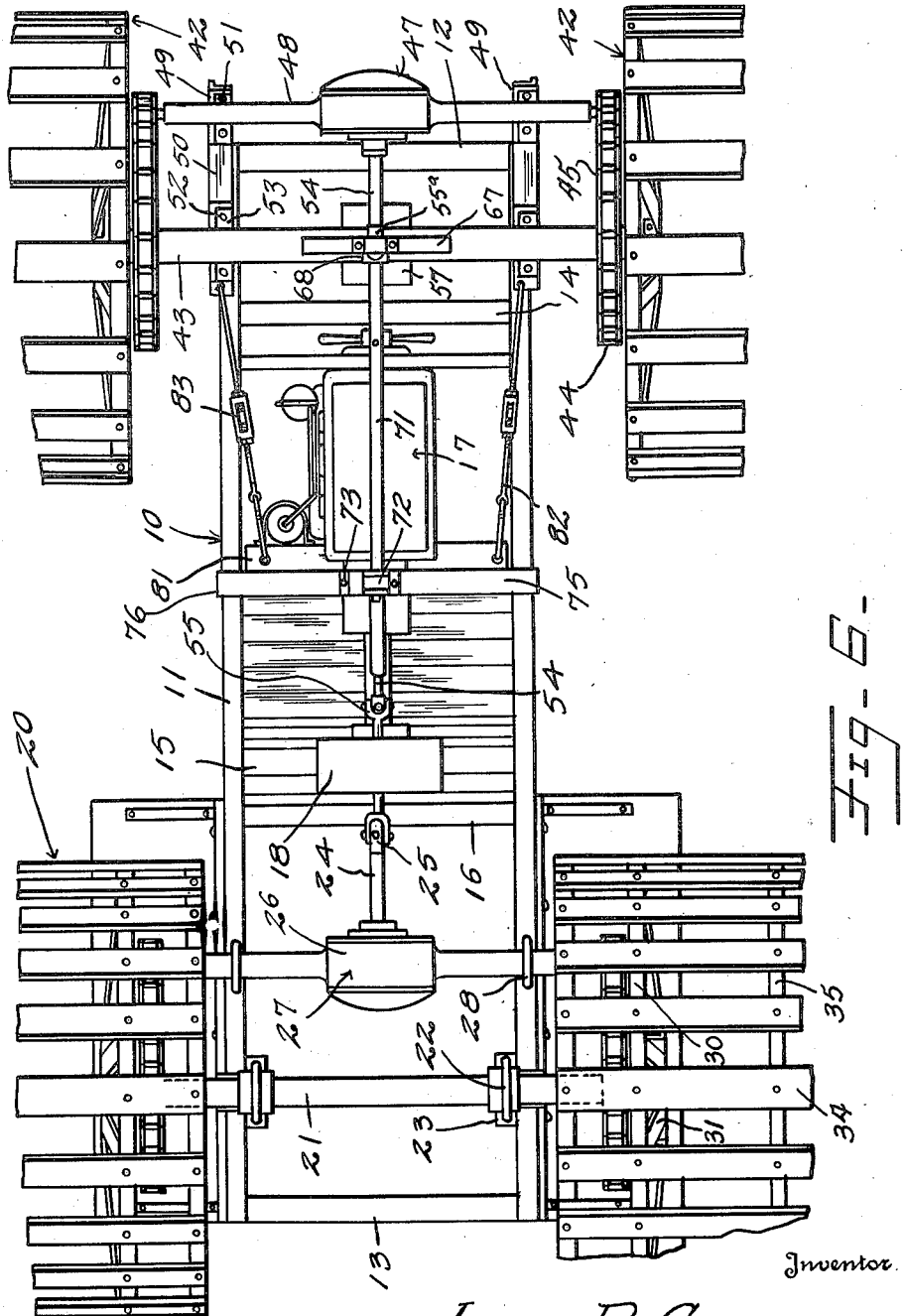

In the drawings,

Figure 1 is a detail side elevation, partly broken away and in section, of a vehicle constructed according to an embodiment of this invention, Figure 2 is a detail front elevation of the device, Figure 3 is a fragmentary sectional view taken on the line 3—3 of Figure 1, Figure 4 is a fragmentary sectional view taken on the line 4—4 of Figure 1, Figure 5 is a fragmentary sectional view taken on the line 5—5 of Figure 1, Figure 6 is a bottom plan view, partly broken away, of the vehicle with the cleats removed from the wheels, Figure 7 is a fragmentary sectional view taken on the line 7—7 of Figure 3, Figure 8 is a fragmentary sectional view taken on the line 8—8 of Figure 4, Figure 9 is a plan view of a water wheel which may be substituted for the wheels shown in Figure 1, Figure 10 is a horizontal sectional view through the wheel shown in Figure 9.

Referring to the drawings, the numeral 10 designates generally a frame or chassis which is constructed of a pair of longitudinal channel members 11, connected together at their front and rear ends by means of connecting bars 12 and 13 respectively. The side members 11 are also connected together by means of intermediate connecting bars 14, 15 and 16.

The chassis or frame 10 also has mounted therein an engine 17 of conventional construction, which is connected to a speed changer or transmission 18 by means of a shaft 19. The chassis or frame 10 has mounted at the rear portion thereof a pair of barrel-like wheels generally designated as 20. The wheels 20 are mounted on a transversely extending axle or shaft 21, being journaled on the shaft 21 and this shaft is fixed to the under side of the frame 10 by means of a pair of U-shaped clamping bolts 22, extending through plates 23, which are welded or otherwise fixed to the inner lower portions of the side members 11.

The transmission 18 has connected to the rear thereof a rearwardly extending shaft 24 in which a universal joint 25 is interposed. The shaft 24 is connected to a differential 26, of conventional construction, which is disposed in a differential housing 27 secured by means of a pair of U-bolts 28 to the lower side of the frame 10 forwardly of the shaft or axle 21.

Each rear wheel 20 includes an inner wheel member 29 which is formed of an outer annulus or felly 30, having radially disposed spokes 31 fixed at their outer ends to the felly 30, and the spokes 31 are fixed at their inner ends to a hub 32 which is journaled on a stub shaft 33, carried by the shaft or axle 21. A plurality of elongated transversely disposed bars 34 are fixed to the periphery of the felly 30, extending outwardly and inwardly therefrom, and these bars 34 have fixed to the inner sides thereof rings or annular members 35. The bars 34 form the tread for each rear wheel 20 and this tread is of very substantial width so that each wheel 20 will engage a very substantial width of ground as the wheel is moved thereover.

The outer sides of the bars 34 have fixed thereto angularly disposed cleats or tread members 36, and also relatively short inner cleats or tread members 37. The hub 32 has fixed thereto a relatively large sprocket wheel 38 about which a chain 39 is trained. The chain 39 is also trained about a driving sprocket 40 which is fixed to a shaft 41 operated by the differential 27. The sprocket 40 is a relatively small sprocket so that the wheels 20 will be rotated at a reduced speed with respect to the shaft 24, the object being to give a great increase in power to the vehicle.

The vehicle also includes a pair of front wheels 42 which are formed barrel-like similar to the rear wheels 20 and are rotatably mounted on a front axle 43. The front wheels 42 also include a large sprocket 44 which is driven by means of a chain 45 trained over a driving sprocket 46. The sprocket 46 is driven from a front differential 47, the tubular housings 48 of which have a pair of angle members 49 secured thereto. The angle members 49 are welded or otherwise fixed to the tubular housings 48 and a pair of forwardly and downwardly inclined angle bars 50 are fixed at their forward ends to the angle members 49 by bolts 51.

The angle members 50, which constitute the differential supporting bars are also fixed at their rear portion to a pair of angle members 53 which are welded or otherwise fixed to the axle 43. Bolts 52 removably secure the supporting bars 50 to the angle members 53.

The transmission 18 also includes a forwardly extending drive shaft 54 having a universal joint 55 interposed therein, and the shaft 54 is connected at its forward end to the differential 47. The drive shaft 54 also has a universal joint 55a located under the front supporting axle 43 so that the front differential and front axle 43 may turn as a unit and power applied to the front wheels at any angle of the latter. In this manner the front and rear wheels are positively driven from the engine 17. The front axle 43 is swivelly mounted at the forward end of the chassis 10 and has mounted at an intermediate point a block 56 which is carried by a plate 57, having webs 58 which are welded as at 59, to the axle 43. A fifth wheel construction generally designated as 60 includes a lower plate or disc 61 formed with ears 62 which are rockably connected to the block 56 by means of a pin or shaft 63.

An upper wheel or plate 64 engages the top of the lower wheel or plate 61 and is rotatably connected thereto by means of a pivot bolt 65 which engages through a transversely extending supporting bar 66, which extends between the side channel members 11. The front axle 43 is braced against rearward movement by means of a truncated V-shaped hanger 67 which is welded to and depends from the axle 43. A bearing block 68 is fixed by fastening members 69 to the horizontal lower portion 70 of the hanger 67 and the forward end of a bracing bar 71 is pivotally secured to the bearing block 68. Preferably the connection between the forward end of the bar 71 and the bearing block 68 is a ball joint connection and said connection between the bar 71 and the bearing block 68 is coaxial with the axis of the pivot member 65.

The rear end of the bar 71 is secured to a mounting 72 which is fixed by fastening members 73 to the horizontal portion 74 of a truncated V-shaped hanger 75. The upper or outer ends of the hanger 75 are formed with ears 76 engaging on the outer sides of the side members 11 and secured thereto by fastening members 79. The front wheels 42 are steered by means of a steering construction 80 which includes an elongated steering bar 81 having steering links 82 connected to the opposite ends thereof. The links 82 are connected at their forward ends to the rear ends of the differential supporting bars 50. Turnbuckles 83 are interposed in the links 82 so that these cables may be maintained taut and in proper alignment. Chains 83a, for limiting the pivotal movement of the steering means extend between the frame 10 and differential steering bars 50.

In the use and operation of this vehicle, the engine 17 will drive the shafts 24 and 54 so as to rotate the rear and front wheels 20 and 42. Due to the large diameter and the very substantial width of the front and rear wheels, these wheels will not sink into the soft ground so that this vehicle will readily operate over marshy ground, whereas vehicles at present available will deeply sink into soft or marshy ground. The provision of the front wheel drive will also make it possible to more readily move the vehicle over the soft ground so that when power is applied to the wheels, all four wheels will turn as a unit. With a vehicle of this kind, marshy ground can be cultivated to the desired degree for planting and harvesting the desired grain or other products, thereby eliminating the necessity of cultivating and harvesting the ground manually.

This vehicle may also be equipped with wheels which permit its use on water.

Referring to Figures 9 and 10, there is disclosed a buoyant water wheel which can be readily substituted for the wheels 20 and 42. The water wheel embodies a cylindrical body 84 having spiral cleats 85 on the outer side thereof which in water will act as propelling blades or paddles. The body 84 has secured to the inner end thereof an inner wall 86 having a central hub 87 for securing to the axle or shaft. The body 84 also includes an outer wall 88 having a center opening 89 which is closed by a plate 90 secured by fastening devices 91 to the wall 88. Removal of the plate 90 will permit access to the interior of the hollow and closed wheel to provide for mounting or removing the wheel from the vehicle.

I do not mean to confine myself to the exact details of constructions herein disclosed, but claim all variations falling within the purview of the appended claim.

What I claim is:

In a tractor as described for use on marshy ground comprising a chassis having a frame with power driving means, the combination of pairs of front and rear wheels rotatably mounted on transversely extended front and rear axles, each of said wheels including a centered hub, a drive sprocket fixed to said hub for rotation thereof, a barrel-like wheel structure attached to the hub outwardly of said sprocket, swivel means securing one of said axles to the chassis for rotation about a vertical and longitudinal axis including a pair of horizontally disposed plates, one of which is secured to the chassis with the other secured to the axle with means securing the plates for relative rotation to each other, a pair of longitudinally extending members carried by the axle having spaced ends forwardly of said swivel means, a transverse drive shaft carried by said members having spaced ends drivingly connected to the hub sprockets, said transverse drive shaft being drivingly connected to the engine by a longitudinal drive shaft having a swivelled joint vertically aligned with said swivel means carried by the front axle, a brace means having a hanger dependently fixed to said front axle below said drive shaft swiveled joint and having a bearing block, a rearwardly extending bracing bar having one end fixedly secured to the chassis, and a ball joint carried by the opposite end of said bar connecting said bearing block to said bracing bar.

JOHN P. CRAIN.

(References on following page)

REFERENCES CITED

The following references are of record in the file of this patent:

UNITED STATES PATENTS

| Number | Name | Date |
|---|---|---|
| 645,429 | Rand | Mar. 13, 1900 |
| 1,064,774 | Romine | June 17, 1913 |
| 1,105,218 | Stewart | July 28, 1914 |
| 1,242,319 | Bruce | Oct. 9, 1917 |
| 1,322,028 | Lehman et al. | Nov. 18, 1919 |
| 1,371,641 | Morton | Mar. 15, 1921 |
| 1,447,073 | Gore | Feb. 27, 1923 |
| 2,023,304 | Brodart | Dec. 3, 1935 |
| 2,268,465 | Townsend | Dec. 30, 1941 |
| 2,341,109 | McLarty | Feb. 8, 1944 |
| 2,432,107 | Williams | Dec. 9, 1947 |

FOREIGN PATENTS

| Number | Country | Date |
|---|---|---|
| 115,309 | Great Britain | May 9, 1918 |
| 152,875 | Austria | Mar. 25, 1938 |